US008640746B2

(12) United States Patent
Luis

(10) Patent No.: US 8,640,746 B2
(45) Date of Patent: Feb. 4, 2014

(54) HIGH FLOW STOPPER WITH VACUUM AND DATE INDICATORS

(76) Inventor: Armando Luis, Hoboken, NJ (US)

(*) Notice: Subject to any disclaimer, the term of this patent is extended or adjusted under 35 U.S.C. 154(b) by 168 days.

(21) Appl. No.: 12/847,617

(22) Filed: Jul. 30, 2010

(65) Prior Publication Data

US 2011/0126939 A1    Jun. 2, 2011

Related U.S. Application Data

(60) Provisional application No. 61/230,256, filed on Jul. 31, 2009.

(51) Int. Cl.
*B65B 31/06*    (2006.01)

(52) U.S. Cl.
USPC ............ 141/65; 141/98; 215/230; 215/260

(58) Field of Classification Search
USPC ........... 141/8, 65, 98; 215/228, 260, 262, 230
See application file for complete search history.

(56) References Cited

U.S. PATENT DOCUMENTS

| | | | |
|---|---|---|---|
| 4,475,576 A | 10/1984 | Simon | |
| 4,684,033 A | 8/1987 | Marcus | |
| 4,763,803 A | 8/1988 | Schneider | |
| 4,911,314 A | 3/1990 | Schneider | |
| 4,989,745 A | 2/1991 | Schneider | |
| 5,215,129 A | 6/1993 | Berresford et al. | |
| 5,803,282 A * | 9/1998 | Chen et al. | 215/228 |
| 6,651,834 B2 * | 11/2003 | Wong | 215/260 |
| 6,886,605 B2 | 5/2005 | Luis | |
| 6,976,669 B2 | 12/2005 | Van Zijll Langhout et al. | |
| 7,048,016 B2 | 5/2006 | Luis | |
| 7,108,023 B2 | 9/2006 | Luis | |
| 2003/0047531 A1 | 3/2003 | Wong | |
| 2004/0200863 A1 | 10/2004 | Van De Braak et al. | |
| 2006/0138068 A1 * | 6/2006 | Tsai et al. | 215/228 |
| 2007/0199612 A1 * | 8/2007 | Larimer et al. | 141/65 |
| 2007/0199615 A1 * | 8/2007 | Larimer et al. | 141/95 |
| 2008/0000792 A1 | 1/2008 | Koch | |
| 2008/0272085 A1 | 11/2008 | Laporta | |

FOREIGN PATENT DOCUMENTS

| | | |
|---|---|---|
| CN | 101434321 A | 5/2009 |
| WO | 2008 002650 A2 | 1/2008 |

OTHER PUBLICATIONS

Form PCT/ISA/210 (ISR) for Application No. PCT/US2010/043937.
EP 10805120.2; Extended Search Report; Aug. 2, 2013; (6 pages).

* cited by examiner

*Primary Examiner* — Timothy L Maust
*Assistant Examiner* — Timothy P Kelly
(74) *Attorney, Agent, or Firm* — Tedd Van Buskirk; Polsinelli PC

(57) ABSTRACT

Devices and methods for the sealing of a container are disclosed. The devices and methods include stoppers that allow for removal of air from the container with a vacuum source. Various embodiments comprise a high-volume valve allowing for expeditious evacuation of the air. The stopper may also comprise a low vacuum indicator to indicate to the user whether the vacuum internal to the container is at or above a desired amount. The stopper may also comprise other indicators, such as a day of the week or month indicator. A rotating bezel may be used to identify temporal or other types of events, such as when the container was first opened.

26 Claims, 8 Drawing Sheets

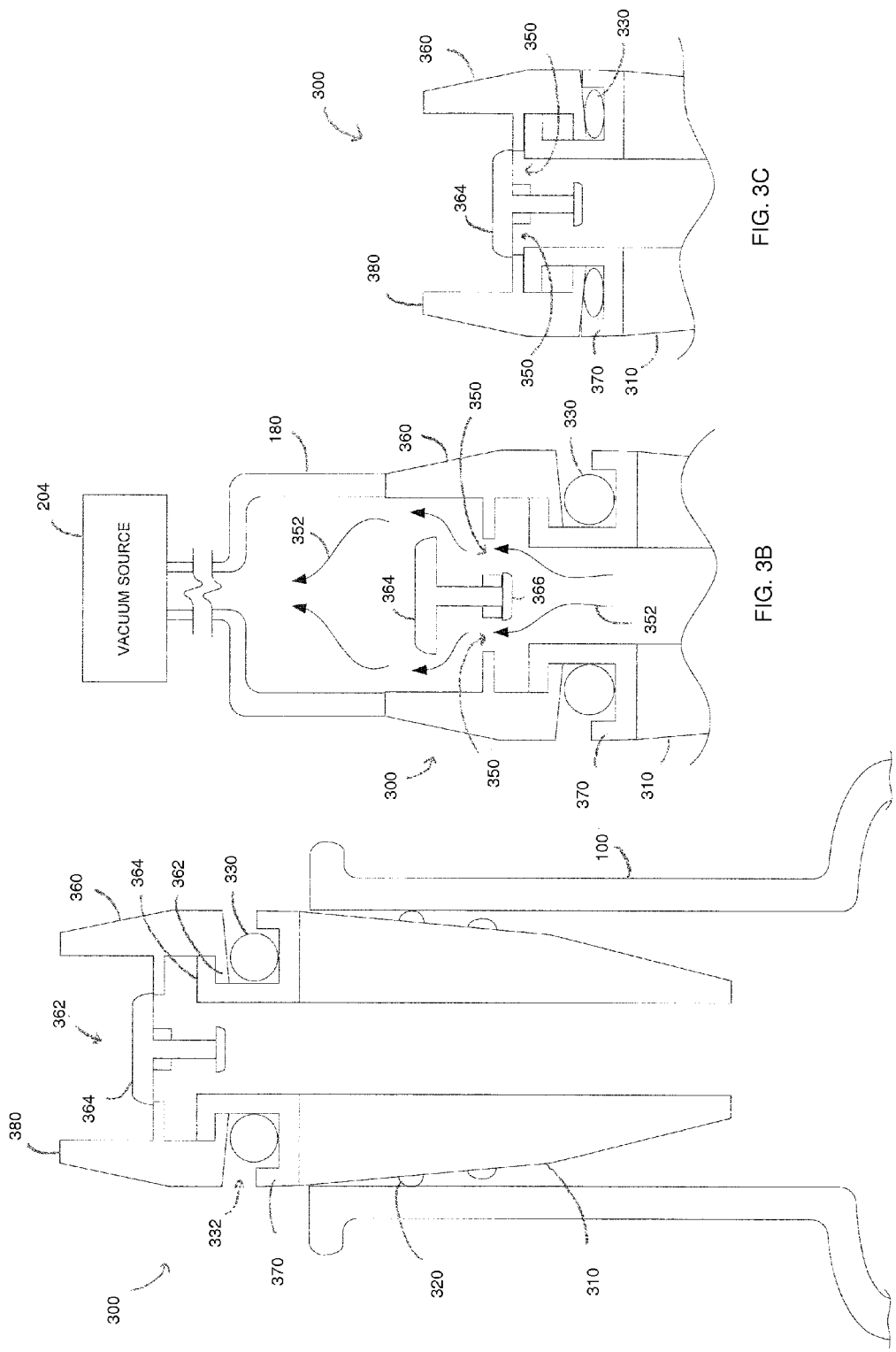

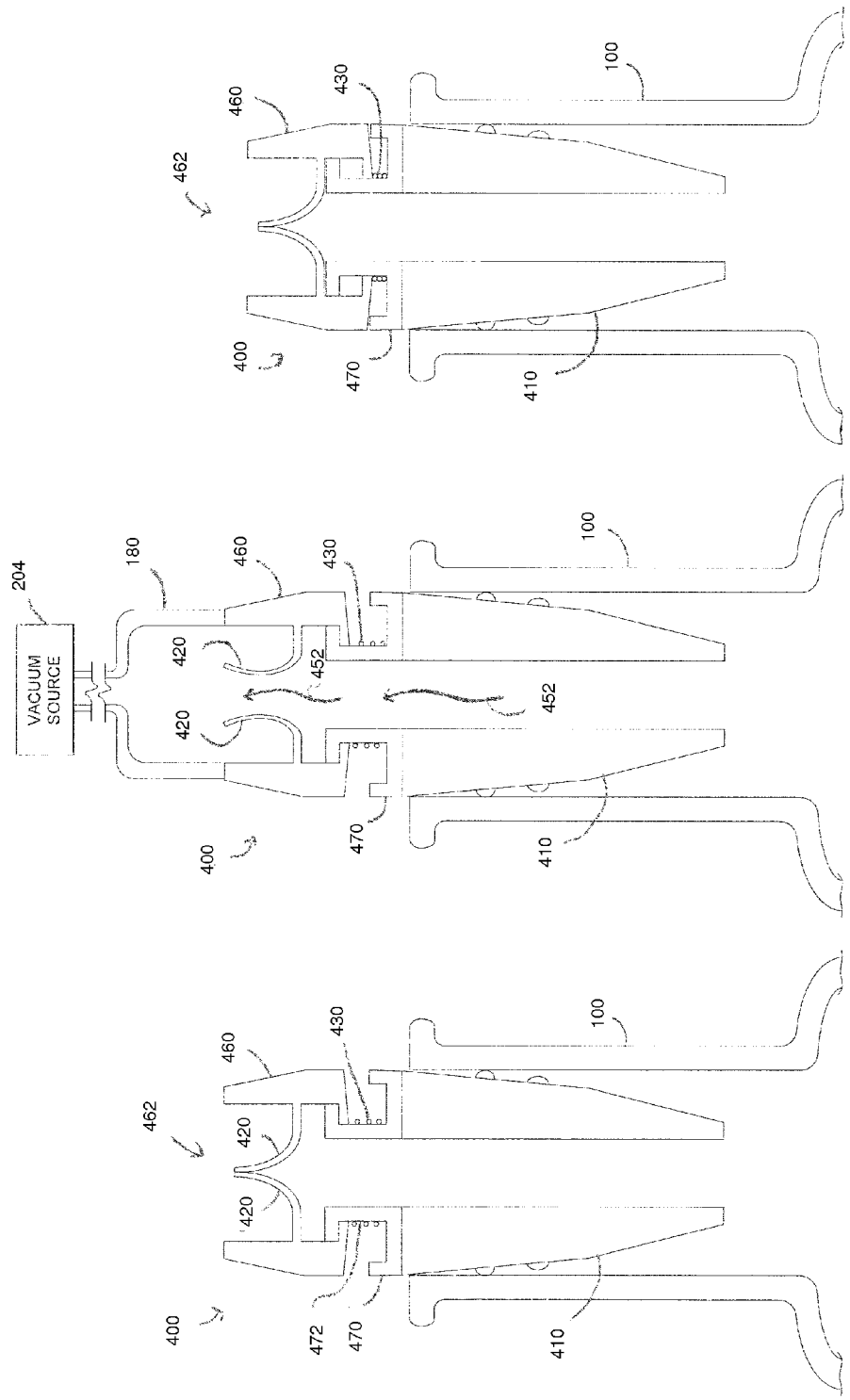

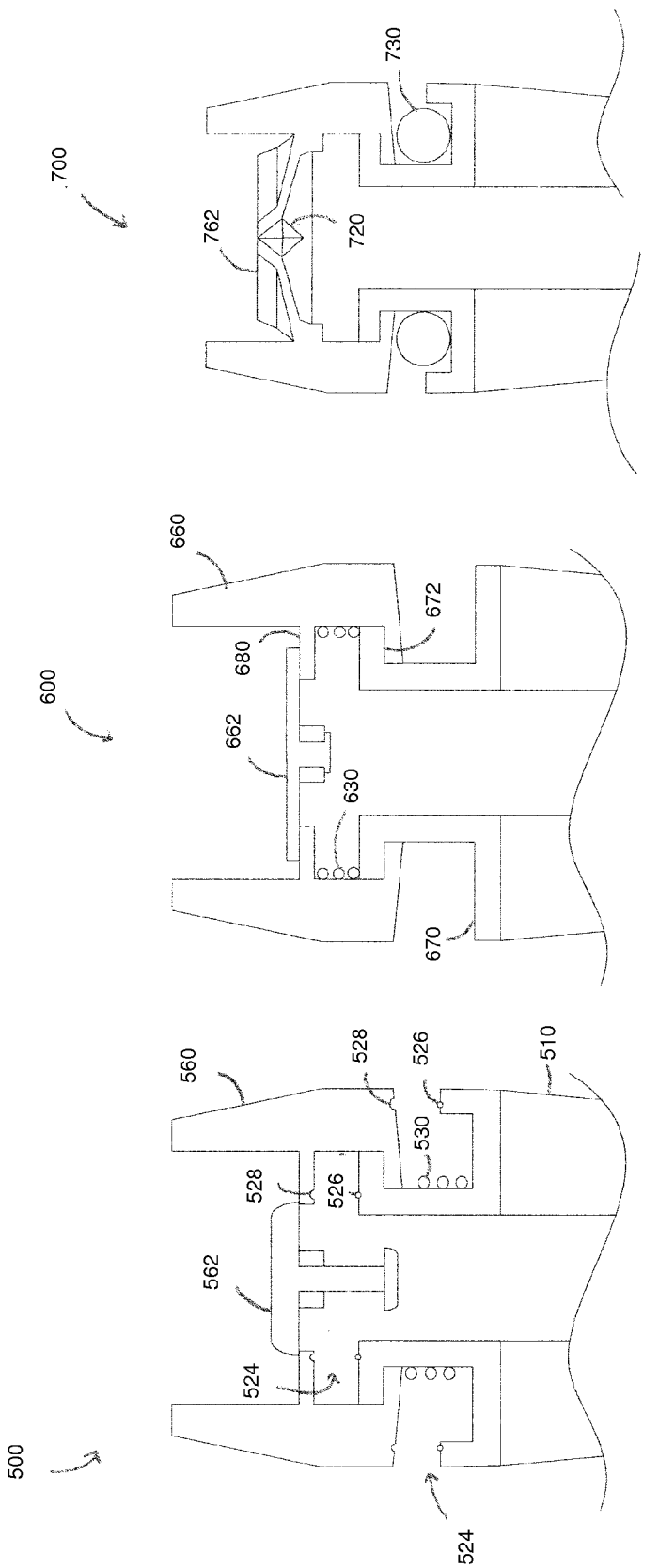

HIGH FLOW STOPPER WITH VACUUM AND DATE INDICATORS

CROSS REFERENCE TO RELATED APPLICATIONS

This application claims priority to U.S. Provisional Application No. 61/230,256 filed Jul. 31, 2009, which is incorporated herein by reference in its entirety.

BACKGROUND

1. Field of the Disclosure

The present disclosure relates generally to the preservation of still beverages and foodstuffs. More particularly, the present disclosure relates to a stopper for sealing the mouth of a wine bottle or other rigid container and allowing removal of air from the vessel to maintain a vacuum inside it.

2. Related Art

It is well known that wine spoils quickly when oxidized through exposure to air. In short, wine+air=vinegar. On the producer/supplier side, much time and money is spent in the quest for the ideal closure, one that seals and protects bottled wine from spoilage, while still allowing wine to benefit from bottle aging. Closures range from traditional cork, to synthetic materials, to screw caps. But on the retail/consumer side, the options for preserving wine, once opened, are few. If a bottle is not finished, it can be adequately maintained at room temperature for several hours—and usually no more than a day or two at most—before developing noticeable off flavors. Refrigeration may in some instances extend the useful life of an opened bottle, but again by no more than several days. The downside to refrigeration is that, when served below their optimal temperature, over-chilled wines often taste dead and lifeless.

One known method for the preservation of wine in a bottle is to evacuate the air space above the liquid once some of the wine has been consumed and then seal the bottle with a stopper. One system for accomplishing this is the Vacu Vin™ wine saver system. The Vacu Vin system requires a special stopper to be placed in the bottle neck. This stopper has a slit that acts as a non-return valve. The valve opens if a vacuum is created above the stopper to allow air to be sucked out of the bottle but closes again as soon as the external pressure is greater than the pressure inside the bottle. To create a vacuum above the stopper, a manual suction pump is used. This operates satisfactorily, but pump operation is time-consuming and strenuous if an adequate level of vacuum is to be produced in the bottle. It has been observed that the maximum vacuum that can be achieved using the Vacu Vin pump is approximately 18 in-Hg. In actual practice, most users achieve a vacuum of approximately 12 in-Hg using this hand pump. There is also no convenient or accurate method of determining when a suitable vacuum level has been achieved.

U.S. Pat. No. 4,684,033 describes another known method of preserving wine in an opened wine bottle by inflating a bladder inside the bottle to fill the space above the liquid and to prevent oxygen from reaching the wine. To do this is a time-consuming operation, which requires considerable manual dexterity in introducing a deflated bladder into the bottle and then inflating it. This method also requires that the bladder be removed, washed, and cleaned after each use.

Another option for preserving an opened bottle of wine involves pouring the contents of the opened bottled into a smaller bottle, decanter or the like having less airspace above the wine, inserting an airtight stopper and then storing. Finally, the air in an opened bottle may be replaced with a layer of inert gas, such as nitrogen, and stored. In one such system as described in U.S. Pat. No. 4,475,576, a stopper is inserted into a bottle to replace the cork and remain with the bottle for the lifetime of the wine. The stopper is provided with passageways and valves to permit the bottle to be pressed against a contact-operated dispenser head, directing a blast of inert gas such as Argon into the bottle to expel at first air, and subsequently a mixture of air and Argon or other inert gas, until the percentage of oxygen is so low as not to represent a threat to the wine.

On the commercial consumption side, however, none of these solutions are adequate. For instance, in restaurants, wine bars and the like where wine is served by the glass, the problem of wine preservation is greatly magnified by the sheer number of bottles. Spoilage accounts for waste and lost profits when opened bottles of wine are not consumed before their useful shelf life. This often limits the selection of wines offered by the glass to those that are either (a) relatively inexpensive or (b) so popular that they are virtually guaranteed to be consumed shortly after opening (e.g. chardonnay, merlot, etc.). There is little incentive for expensive wines, older vintages, or lesser-known varietals to be offered where the chance of unfinished bottles and spoilage is great. It is impractical, particularly in a busy restaurant or bar, for servers to use any of the previously mentioned methods to preserve opened bottles of wine. Evacuating air from a bottle using a hand pump such as the Vacu Vin is time-consuming and inconsistent. A bartender is unlikely to take the time required to properly vacuum seal a bottle of wine by hand when there are customers waiting to be served. Also, if the pumping and sealing is delayed, the damage to the wine from exposure to air is already done.

Decanting and storing opened wine in smaller vessels is even more unrealistic in the commercial setting. Also, while inert gas systems find use in some retail serving establishments, such systems can be quite expensive due not in the least part to the continued consumption of the inert gas. Inert gas systems are also impractical due to their bulk and the space required to install and maintain such a system, in which each bottle of wine requires its own stopper and tap for dispensing the stored wine.

Mechanical pump systems located at the bar are expensive, slow, and noisy. One mechanical system is described in U.S. Pat. No. 5,215,129 and has been commercialized as "Le Verre de Vin" (the glass of wine) system. The system comprises a self-contained wall-mounted unit, which receives a wine bottle. Pressing the wine bottle into a housing and closing electrical contacts housed therein starts a pump. Once the contacts are closed, the pump begins to draw air in the bottle through a stopper having a one-way valve.

While the Verre de Vin system can be used to evacuate air from a bottle of wine, it has some inherent operational—as well as commercial—drawbacks. Initially, because the system is designed without a vacuum tank, the pump must cycle on and off with each depression of the housing. This creates at least three interrelated problems. Initially, the pump is noisy and can be annoying to patrons of the establishment in which such a device is installed. Secondly, the pump can only be started and stopped a predetermined number of times over a set period. Any more frequent actuation can result in the failure of the motor. According to its specifications, the Verre de Vin system can evacuate no more than fifteen bottles over a five-minute period. In a busy bar setting, this number can easily be surpassed, resulting in partially consumed bottles being left un-evacuated. Third, because there is no storage tank to maintain a vacuum in the system, there is a delay between the actuation of the pump and the drawing of a vacuum on the bottle. This is a result of the pump having to also evacuate air from the line between the pump and the bottle. It has been observed that in order to achieve a vacuum of 22 in-Hg in a half-empty, standard 750 mL wine bottle using the Verre de Vin system requires twelve seconds. In a busy setting in which customers are waiting to be served, a bartender is unlikely to take this time to evacuate a bottle of wine between each pour, leading to partially consumed bottles of wine being left exposed to air. Finally, due to the size and single-user nature of the Verre de Vin system, the owner of a bar or other establishment is forced to sacrifice precious bar space for mounting or housing the device in a central location accessible throughout the service area. These and other problems make the Verre de Vin system a less than ideal solution.

One commercially available system has recently been introduced to overcome a number of these problems. The Vinfinity® Wine-By-The-Glass System utilizes a vacuum storage tank both to reduce the time needed to fully evacuate the bottle and to increase the vacuum level ultimately attained in the bottle. The Vinfinity® Wine-By-The-Glass System can attain vacuum levels as high as 30 in-Hg, with a preferred operating range of 23-25 in-Hg providing better protection for the resealed wine. The system can reach these vacuum levels in a wine bottle that is one-quarter full in two seconds or less, significantly increasing the likelihood of use in busy serving environments. Further details of the Vinfinity® Wine-By-The-Glass System can be found in U.S. Pat. Nos. 6,886,605, 7,048,016, and 7,108,023, the disclosures of which are fully incorporated by reference herein.

The Vinfinity® Wine-By-The-Glass System has applications beyond that of wine preservation. Many foodstuffs, both in isolation or in preparations, can also benefit from the elimination of oxygen from the storage container, decreasing the spoliation of the foodstuffs and allowing the foodstuffs to retain their freshness over longer periods. Institutional use of such a system increases the institution's ability to purchase and open large containers without the pressure to immediately use or waste a portion of the contents.

Despite the many advantages offered by the Vinfinity® Wine-By-The-Glass System, it and all other currently available mechanical pump systems are still limited by the speed with which air can be evacuated from the vessel through the stopper. The amount of time required to evacuate air from a container is directly proportional to the amount of air initially present in it and inversely proportional to the smallest size aperature in the path between the container and the vacuum pump. This behavior can be likened to the flow of gas through a pipeline, where the minimum aperture size along the length of the pipeline defines the rate at which gas is able to flow from one end of the pipeline to the other end.

Currently available stopper designs severely limit the rate of airflow due to the small sizes of their valve openings. Perhaps the most widely recognized example among wine enthusiasts is the stopper design described in U.S. Pat. Nos. 4,763,803, 4,911,314, and 4,998,633. This stopper design is widely used in hand vacuum preservation systems such as the Vacu Vin and also is used in the Verre de Vin and Vinfinity® Wine-By-The-Glass Systems described above. The stopper employs what is known as a slit valve (FIG. 1A), in which elastic material is formed with a slit extending from the top of the outside of the stopper to the inside of the portion of the stopper extending into the bottle. Applying a vacuum to the top edge of the slit causes the two pieces of elastic material to separate enough to allow the flow of air from the bottle. When a user wishes to release the vacuum from the bottle, the ends of the slit can be squeezed toward each other, deforming the elastic material and allowing air to enter the bottle through the resulting gap in the top of the stopper, thereby equalizing the pressure between the inside and outside of the container. This design has the benefit of being formed from a single piece of elastic material, reducing manufacturing complexity and the opportunity for manufacturing defects. The rate of air flow through such a stopper is low, however, due to the small size of the aperture in the slit valve.

Another popular stopper design used in the Vacu Vin and Vinfinity® Wine-By-The-Glass Systems described above is described in U.S. Pat. No. 6,976,669. This stopper utilizes a rigid valve seat into which an elastic valve body fits, sealing the container. The top of the stopper (FIG. 1B) contains small through holes that allow the passage of air in either direction between the outside of the stopper and the inner area surrounding the valve seat. The elastic valve body can be deformed by the application of a vacuum, allowing air to escape through the channel composed of the gap created between the valve seat and valve body and the holes in the top of the stopper. When a user wishes to release the vacuum from the bottle, the valve body can be deformed by hand, allowing air to enter the bottle through the channel composed of the holes in the top of the stopper and the resulting gap between the valve seat and valve body. But this stopper design also significantly limits the rate of air flow through the valve, due both to the limited size of the gap that can be created between the valve seat and valve body and to the small size of the holes in the top of the stopper.

Other similar stopper designs exist, all of which share the disadvantage of a small aperture through the stopper body and a resultant low volume of airflow through the stopper. A more effective stopper design will have an aperture size that approaches the inner diameter of the mouth of the bottle or other container to allow air to be evacuated as rapidly as possible.

The rate of flow problem is compounded as the size of the container increases. Clearly, the time required to adequately depressurize a half-consumed 750 mL bottle is much less than that of a large format bottle (e.g. a magnum, Jeroboam, Methusaleh, Nebuchadnezzar, etc.) as well as a five gallon food service container or the like common throughout the restaurant industry. Such containers are commonly used to store all manner of foodstuffs, including sauces, condiments, soups, dressings, etc. Although the Vinfinity® Wine-By-The-Glass System has the ability to adequately and rapidly apply a vacuum to such a sealed container, today's commercially available stoppers are the limiting factor.

An additional shortcoming of existing commercially available stopper designs is that they do not allow the user to quickly and accurately determine whether (a) the user, likely working in a fast-paced service environment, has resealed and vacuumed a container; (b) the sealed container has a vacuum level sufficient to preserve its contents, or (c) the vacuum level has diminished over time due to a dirty or faulty stopper or a leak, thereby putting the integrity of its contents at risk. An ideal stopper will clearly and boldly indicate that the internal vacuum level in the container is above or below a minimum threshold necessary to preserve the wine or other contents.

Currently available stoppers do not adequately solve these problems. One example is the stopper accompanying the Trudeau Elite Wine Preserving Pump. This stopper has a small button indicator mounted on a flexible diaphragm at the top of the stopper. The side of the button indicator is colored to contrast with the rest of the stopper. When no vacuum is present in the bottle, the resting position of the diaphragm leaves the side of the button indicator visible to the user, the contrasting color thereby indicating a lack of vacuum in the bottle. The presence of a vacuum in the bottle flexes the diaphragm, lowering the button indicator into the body of the stopper and reducing the visibility of the contrasting color. Three problems exist with this design. First, the button indicator is very small, and the range of motion between the sealed and unsealed states is very limited, thus causing difficulties in determining the state of the button indicator from any distance. Second, the side of the button indicator does not completely disappear from view when the stopper is in its sealed state, thus requiring the user to carefully inspect the stopper to ensure the bottle is properly sealed. In a busy service environment, servers are unlikely to take the time for this level of careful inspection, thus reducing the effectiveness of the preservation system. Third, the amount of vacuum required to lower the button indicator into the body of the stopper is very low—nowhere near the ideal 23-25 in-Hg vacuum achieved by the Vinfinity® Wine-By-The-Glass System—which may result in users having a false sense of security that the container is properly sealed when, in fact, the bottle contains insufficient vacuum to retard the degradation of its contents.

Two existing vacuum storage systems use alternative methods to indicate the presence of a vacuum. The first method, described in U.S. Pat. No. 4,989,745, incorporates a visual vacuum feedback into the actual storage container. The top portion of the container is mounted on a vertical slide mechanism that is biased in the upward direction, exposing an inner surface that is a different color than the outer surface. When a vacuum is created in the container, the vacuum force overcomes the bias and pulls the top portion of the container down to its lower limit of travel, hiding the inner surface. In this manner, the user has a clear visual indication when the vacuum level in the container has diminished. This method has limited applications due to the fact that it requires both a specialized container and stopper, increasing the complexity and cost of the system and decreasing its desirability for applications such as wine and institutional food service.

The second alternative method, described in U.S. Patent Application Publication No. 2004/0200863 A1, incorporates audible feedback means into a hand-operated vacuum pump. When the vacuum pump generates a sufficiently high vacuum during a stroke, a physical object in the pump will audibly indicate that the desired vacuum level has been reached. One embodiment describes a plate-like part that creates a clicking sound when inverted by the vacuum force. Two problems exist with this design. First, putting the vacuum indication in the pump rather than the stopper creates a single point of failure in the system and increases the replacement costs in the event that the vacuum indicator mechanism fails. Second, after the pump is removed from the stopper, subsequent users have no way to tell whether a given container still holds a sufficient vacuum. To determine this, they would have to fit the pump to every single container and actuate the pump to receive the audible feedback. This would be time-consuming and likely would not be done in busy environments, allowing spoilage of contents of containers either not sealed or inadequately sealed.

Another important factor in the food and wine service industry is the ability to quickly determine the amount of time that has elapsed since a bottle, container, or the like was initially opened. Despite the best efforts of the vacuum system, some small amount of oxygen may remain in the bottle after it is resealed. This oxygen may create a noticeable "off" taste in the wine several weeks after opening, depending on the vacuum level, the quality of the seal, the number of times the wine has been opened, and the characteristics of the wine itself. Foodstuffs may degrade and spoil even quicker in the presence of residual air. If a server, chef, cook, etc. can tell, at a glance, that the container was opened before a certain date, he can preemptively discard the potentially spoiled contents rather than serving them to a customer.

Existing options for recording a container's initial opening date do not meet the needs of a busy service environment. Hand labeling is cumbersome and requires a server to have a pen on hand at all times. The format of hand labels is dissatisfying as well. Adhesive labels can be messy and are not aesthetically pleasing. Rigid paper labels that are hung on the neck of the bottle or applied to other containers are commercially available, but these also compromise aesthetics and can fall off easily. Labeling machines can be used, but these require both a costly initial purchase and ongoing consumables and maintenance.

Accordingly, there is a need for a stopper having a design that allows rapid evacuation of air from a wine bottle or other container. There is a further need for a stopper that contains an integral indicator mechanism for setting and subsequently identifying the date the container was initially opened. Finally, there is a need for a stopper having an internal vacuum indicator for visually indicating whether the container is under vacuum. Such a stopper will enable restaurants and bars to open a greater variety of wines for their "by the glass" consumers without fear of unduly impeding the workflow of the servers or inadvertently serving spoiled wine to a customer.

It is therefore an object of the disclosures to provide a stopper that allows the rapid evacuation of air from a wine bottle or other container to support the timing constraints of users in busy commercial environments.

It is a further object of the disclosures to provide a stopper that creates and maintains a consistent and reliable seal that is resistant to degradation caused by the buildup of particulate matter on the sealing mechanism.

It is a further object of the disclosures to provide a stopper that indicates the status of the vacuum within the container to allow users to identify, at a glance, containers with an internal vacuum level below a level sufficient to retard the degradation of the contents.

It is a further object of the disclosures to provide a stopper that allows users to rapidly and easily set and subsequently identify the date on which the container was initially opened or stored, both to promote dispensing of earlier-opened containers and to promote disposal of spoiled contents before they are served to a customer.

Other objects, features, and advantages of the disclosures will become apparent from the drawings and following description.

SUMMARY

In various embodiments, a stopper to seal an opening of a container and to allow the removal of air from the container with a vacuum source is described. The stopper may comprise a bottom portion sized to fit within the opening of the a container and a top portion. The top portion may comprise a vacuum source interface. In various embodiments, the stopper may also comprise a valve, an inscription, and an indicator to selectably identify a portion of the inscription.

In various embodiments, the stopper may comprise a first portion sized to fit within the opening of the container and a second portion movable between a first position and a second position. The stopper may be used to seal an opening of a container and to allow the removal of air from the container with a vacuum source. In various embodiments, the stopper may comprise a valve and a low vacuum indicator, where the low vacuum indicator is visible when the second portion is in the first position and the low vacuum indicator is at least partially obscured when the second portion is in the second position. The stopper may comprise a biasing device for applying a force to the second portion to maintain the second portion in the first position and permit translation of the second portion to the second position in the presence of a desired vacuum level in the container.

In various embodiments, the stopper may comprise a first portion sized to fit within the opening of the container, a second portion movable between a first position and a second position, a valve, and a low vacuum indicator, where the low vacuum indicator is visible when the second portion is in the first position and the low vacuum indicator is at least partially obscured when the second portion is in the second position. In some embodiments, the stopper may comprise a biasing device to maintain the second portion in the first position in the absence of a desired vacuum level in the container and permit translation of the second portion to the second position in the presence of the desired vacuum level in the container. Furthermore, the stopper may comprise an inscription of temporal units and an indicator to selectably identify a portion of the inscription.

In various embodiments, the stopper may be used to seal a bottle of wine or other container. The stopper may be placed in mouth of the bottle, for example, and a vacuum source may be used to lower the pressure internal to the bottle. A low vacuum indicator on the stopper may be used to indicate if the pressure in the container is at a desired level.

BRIEF DESCRIPTION OF THE DRAWINGS

The accompanying drawings, which are included to provide a further understanding of the invention and are incorporated in and constitute a part of this specification, illustrate embodiments of the according to the disclosures and together with the description serve to explain the principles thereof. In the drawings:

FIGS. 3A, 3B and 3C are cross-sectional views of a stopper with a poppet valve in accordance with various embodiments.

FIGS. 4A, 4B, and 4C are cross-sectional views of a stopper with a duckbill valve in accordance with various embodiments.

FIG. 5 is a cross-sectional view of a stopper comprising sealing features in accordance with various embodiments.

FIG. 6 is a cross-sectional view of a stopper comprising an internal biasing device in accordance with various embodiments.

FIG. 7 is a cross-sectional view of a stopper comprising a cross slit valve in accordance with various embodiments.

DETAILED DESCRIPTION OF CERTAIN PREFERRED EMBODIMENTS

Various non-limiting embodiments of the present disclosure will now be described to provide an overall understanding of the principles of the structure, function, manufacture, and use of the systems, apparatuses, accessories, and methods disclosed herein. One or more examples of these non-limiting embodiments are illustrated in the accompanying drawings. Those of ordinary skill in the art will understand that the systems, apparatuses, accessories, and methods specifically described herein and illustrated in the accompanying drawings are non-limiting exemplary embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

Figure 1A:
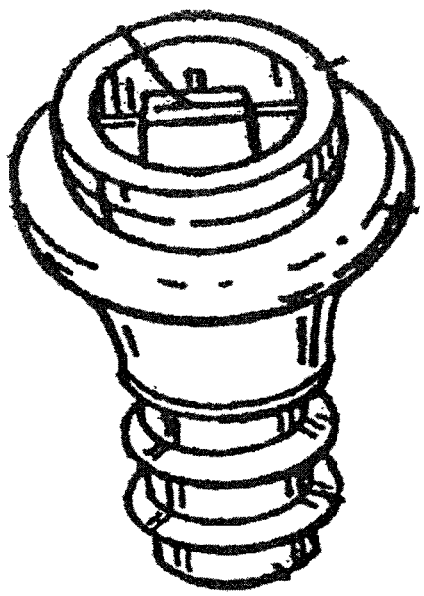
FIGS. 1A and 1B are perspective views of two prior art stoppers.
Figure 1B:
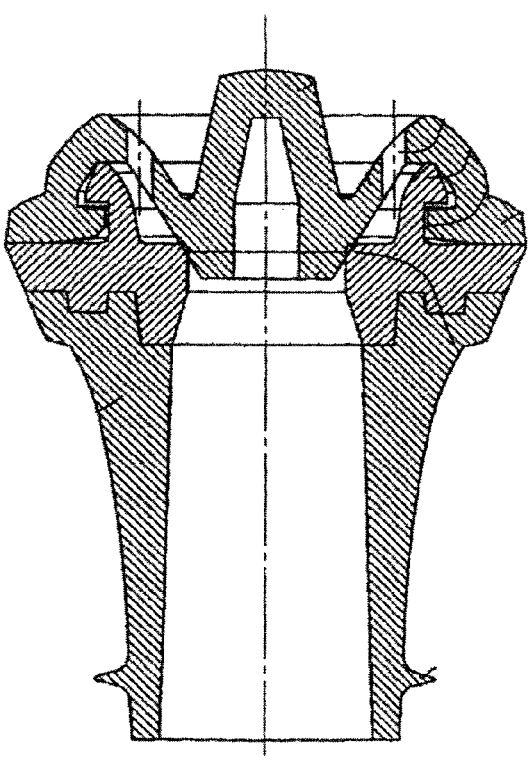
Figures 2A, 2B:
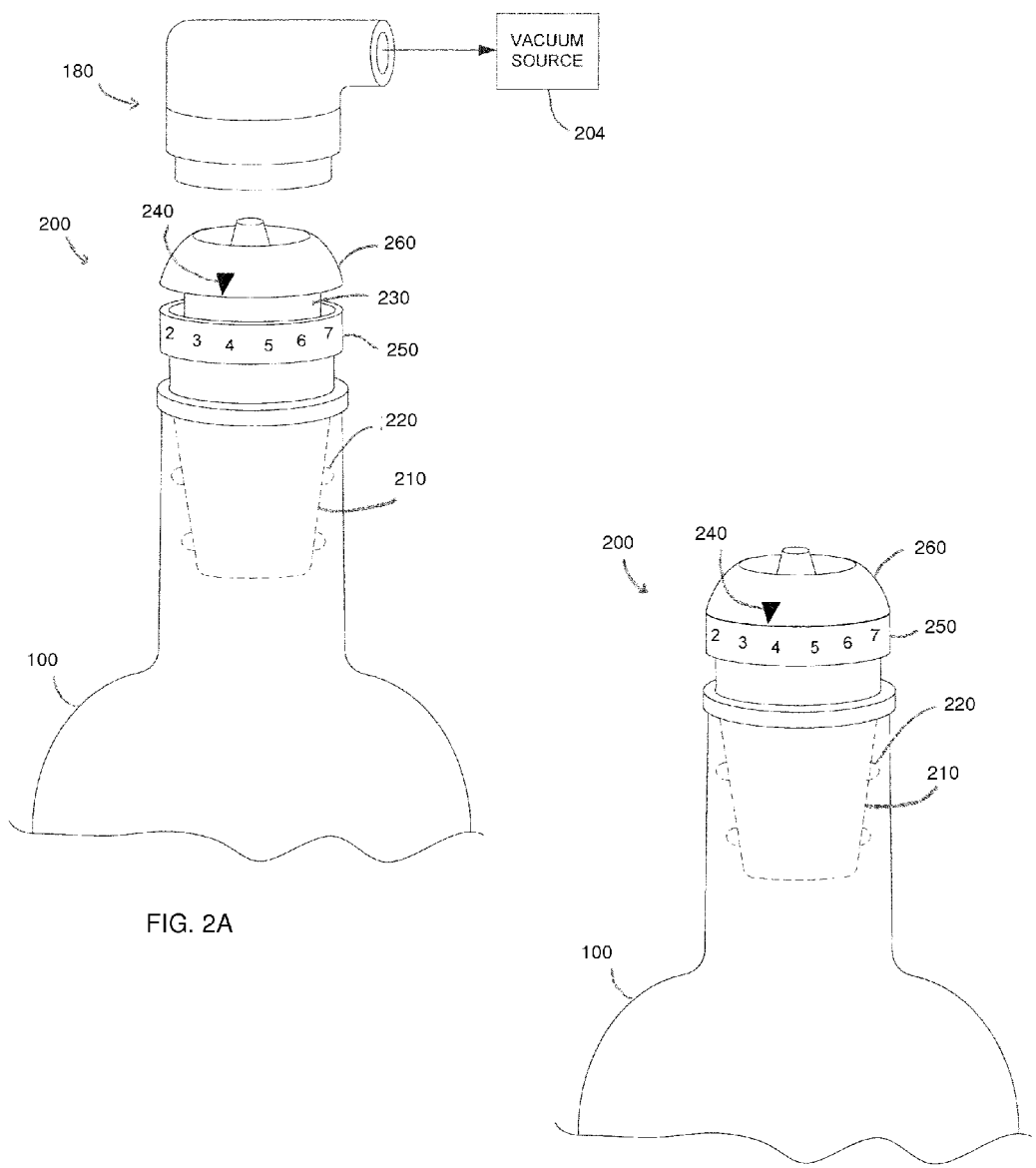
FIGS. 2A and 2B are perspective views of a stopper in accordance with various embodiments.

FIGS. 2A and 2B depict a stopper 200 according to one disclosed embodiment. Stopper base 210 is sized to fit within the mouth of a standard wine bottle 100, with one or more sealing ribs 220 providing an airtight seal between the mouth of the bottle and the stopper. The sealing ribs 220 may have an outer diameter slightly greater than the inner diameter of the mouth of the bottle or other container. Although described herein in terms of a wine bottle, those skilled in the art will appreciate that the stopper can be scaled up or down to fit whatever container is desired to be sealed. Stopper base 210 and sealing ribs 220 may be formed as a single piece and may be composed of an elastic material, such as rubber. Those skilled in the art will recognize other appropriate materials and configurations may be used. Stopper top 260 is formed to interface with vacuum valve head 180, which extracts air from bottle 100 (or other container) through stopper 200 using a vacuum source 204. Vacuum source 204 may be, for example, a vacuum pump. A low vacuum indicator 230 may have a contrasting color compared to stopper top 260. Low vacuum indicator 230 may be a yellow or orange band, for example. In one embodiment, stopper top 260 is white, or light colored, and low vacuum indicator 230 is black, or dark colored. When sufficient vacuum is achieved in the bottle, the vacuum causes stopper top 260 to cover, or otherwise obscure, low vacuum indicator 230. When obscured, the contrasting color is at least partially hidden from view and thus visually indicates to the user that a desired vacuum level has been achieved within bottle 100. Accordingly, a user can quickly scan a large collection of vacuum sealed wine bottles, or other containers, and determine if the low vacuum indicator 230 is visible on any of the stoppers.

In one embodiment, the numbers 1 through 31 inclusive, corresponding to the days in a month, may be inscribed with even spacing around the outer edge of date indicator 250. The inscription may be on any suitable portion of the stopper 200, such as the stopper top 260 or the stopper base 210. In the illustrated embodiment, when a user first opens the bottle, the user rotates stopper top 260 so that indicator 240 points to the number on date indicator 250 corresponding to the current day of the month. As may be appreciated, stopper top 260 may employ a detent or other suitable techniques to impede unintentional rotation of stopper top 260. Stopper top 260 may be rotatable when a vacuum is not applied to the bottle (FIG. 2A) and when the vacuum is applied to the bottle (FIG. 2B), stopper top 260 is generally not rotatable. Accordingly, when the vacuum is applied to bottle 100, indicator 240 is "locked" at a desired relative position to date indicator 250. Before serving or using the contents of a previously opened container, the user may compare the date indicated by indicator 240 to a "discard if opened prior to" date according to the policy of the serving establishment. If the container was opened before the discard date, the user would open a fresh one rather than serving from the expired container.

FIGS. 3A, 3B and 3C depict cross-sectional views of one exemplary stopper in a pre-vacuum state, evacuation state, and a post-vacuum state, respectively. FIG. 3A illustrates a stopper 300 in accordance with one embodiment. Stopper 300 may be placed in bottle 100 such that sealing ribs 320 and stopper base 310 form an air-tight seal with bottle 100. Stopper 300 may comprise a stopper top 360 that is configured to translate vertically with respect to stopper base 310 from a first position (shown in FIG. 3A) to a second position (shown in FIG. 3C). Stopper top 360 may comprise a valve 362 that opens when a vacuum is applied to stopper 300. As illustrated, valve 362 may be a poppet valve 364. In various embodiments, stopper 300 may comprise an o-ring 330 located in a retaining groove 332. O-ring 330 may be a contrasting color and serve as a low vacuum indicator. O-ring 330 may also serve to bias stopper top 360 in a first position, as illustrated in FIG. 3A. When little or no vacuum is present in volume 100, o-ring 330 may separate stopper top 360 from stopper base 310 and be visible to a user through retaining groove 332. O-ring 330 may be comprised of any suitable materials, such as an elastomeric material, and may be hollow or solid. Further, those skilled in the art will recognize that other spring biasing mechanisms can be used such as leaf springs, coil springs, and resilient materials, etc. As illustrated, stopper top 360 may engage a collar 370. In one embodiment, stopper top 360 comprises a flange 362 that is configured to engage a shoulder 364 of collar 370 when little or no vacuum is present in bottle 100. Collar 370 may be manufactured from any suitable material, such as a plastic, or similar material. Stopper top 360 may be manufactured from any suitable material or combination of suitable materials. In one embodiment, at least a portion of stopper top 360 is manufactured from a similar material to collar 370 allowing for a sliding engagement between the two. Stopper top 360 may also comprise a lip or flange 380 configured to interface with vacuum head 180. As is to be appreciated, lip 380 may be any suitable size and configuration for engaging vacuum head 180. Further, while not illustrated in FIGS. 3A-3C, it is appreciated that stopper 300 may comprise various indicators, such as a date indicator.

Referring to FIG. 3B, when vacuum head 180 is placed on stopper top 360 and a vacuum is applied with vacuum source 204, poppet valve 364 may be drawn toward vacuum head 180. When poppet valve 364 is drawn toward vacuum head 180, the passage of air out of bottle 100 is allowed through valve apertures 350, as indicated by arrows 352. In one embodiment, a collet 366 on poppet valve 364 may limit the vertical movement of poppet valve 364. Due to the relatively large size of the apertures 350, a large volume of air may be removed from bottle 100 expeditiously.

Referring to FIG. 3C, after a desired vacuum level has been created inside bottle 100, vacuum head 180 is removed from stopper top 360. Poppet valve 364 is drawn toward the stopper base and closes over apertures 350 to prevents the passage of air back into bottle 100. When the vacuum level in bottle 100 exceeds a given threshold (in the case of preserving wine, at least approximately 18 in-Hg, for example), the force of the vacuum overcomes the biasing force of o-ring 330, or other biasing device, thereby pulling stopper top 360 toward lower stopper base 310. When the stopper top 360 moves to this second position, the low-vacuum indicator, such as o-ring 330, is at least partially obscured from view. As a result of the vacuum force within bottle 100, o-ring 330 may compress or otherwise deform from its original shape. Stopper top 360 may stay in this second position until the vacuum in bottle 100 is released.

Referring to the cross-section illustrations in FIGS. 4A, 4B, and 4C, other valving techniques, such as a duckbill valve may be implemented. Stopper 400 may have similar features to stopper 300. In place of an o-ring, a compression spring 430 is positioned around collar 470. A wall 472 of collar 470 may be a contrasting color and server as a low vacuum indicator. In various embodiments, spring 430 may be a contrasting color as well. As illustrated, spring 430 may provide a biasing force to separate stopper top 460 from base 410 when little or no vacuum is present in bottle 100. Stopper 400 may comprise a duckbill valve 462. Duckbill valve 462 may be constructed from a single piece of elastomeric material, having the shape of opposing lips 420. Referring to FIG. 4B, when the atmospheric pressure above valve 462 is lower than that below valve 462, lips 420 are separated, allowing the passage air from the high-pressure side of valve 462, as indicated by arrows 452. Referring to FIG. 4C, when vacuum head 180 is removed from stopper top 460, lips 420 are drawn together to prevent the passage of air back into bottle 100. As a result of the vacuum force within bottle 100, the biasing force of spring 430 is overcome, and stopper top 460 is drawn to stopper base 410 which obscures low vacuum indicator, such as wall 472. Those skilled in the art will recognize that other high-flow valve designs can be used.

The amount of vacuum necessary to overcome the biasing device, such as an o-ring or a spring, may be partially determined by the characteristics of the biasing device. Therefore, the amount of vacuum required to obscure the low vacuum indicator may be tuned based on the biasing device. For example, some biasing devices may compress at vacuum levels around 18 in-Hg, while other biasing devices may compress at vacuum levels around 25 in-Hg. Stoppers used with hand-pump vacuum devices may require a first vacuum level to obscure the low vacuum indicator, while stoppers for use with higher powered vacuum pumps may be configured to require a higher second vacuum level to obscure the low vacuum indicator. In some embodiments, the biasing devices may be changed on the stopper by the user in order to tune the response the stopper's low vacuum indicator.

FIG. 5 is a cross-sectional illustration of an embodiment of stopper 500 comprising additional sealing features. In the illustrated embodiment, stopper 500 comprises a spring 530 and a poppet valve 562. Stopper 500 may comprise seals 524 configured to form a seal when stopper top 560 is drawn toward stopper base 510 during a vacuum condition. As is to be appreciated, while two seals 524 are illustrated, any suitable number of seals 524 may be implemented in any suitable location. Seals 524 may comprise, for example, a sealing o-ring 526 that is received by a groove 528. Seals 524 may be configured to maintain the vacuum in a bottle or other container.

FIG. 6 is a cross-sectional illustration of an embodiment of stopper 600 comprising an internal biasing device according to another embodiment. In the illustrated embodiment, stopper 600 comprises a spring 630 that is internal to stopper top 660 and is located between a shoulder 672 of collar 670 and a flange 680 of stopper top 660. Similar to previously described embodiments, spring 630 may compress in the presence of suitable vacuum levels internal to stopper 600. As described in more detail below with regard to FIG. 8, an umbrella valve 662 may be used.

FIG. 7 is a cross-sectional illustration of an embodiment of stopper 700 comprising an example of a cross slit valve according to another embodiment. Slit valve 762 may be constructed from a single piece of elastomeric material, the top portion of the valve having the shape of four cuspids 720. When the atmospheric pressure above valve 762 is lower than that above valve 762 (i.e., when a vacuum valve head 180 applies a vacuum), cuspids 720 are separated, allowing the passage air from the high-pressure side of valve 762. While an o-ring 730 is illustrated in FIG. 7, it is appreciated that this embodiment, or any other illustrated embodiment, is not limited to the illustrated arrangement.

Figure 8:
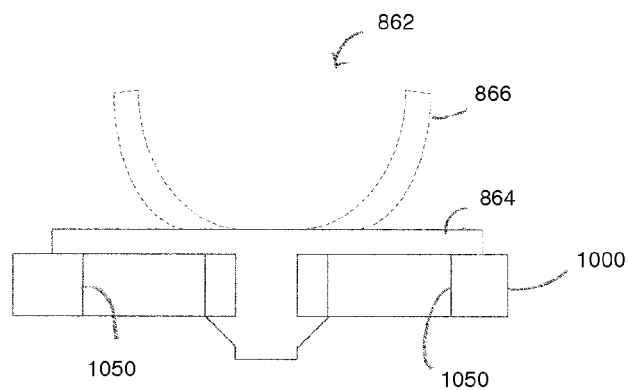
FIG. 8 is a cross-sectional view of an umbrella valve in accordance with various embodiments.
Figure 9:
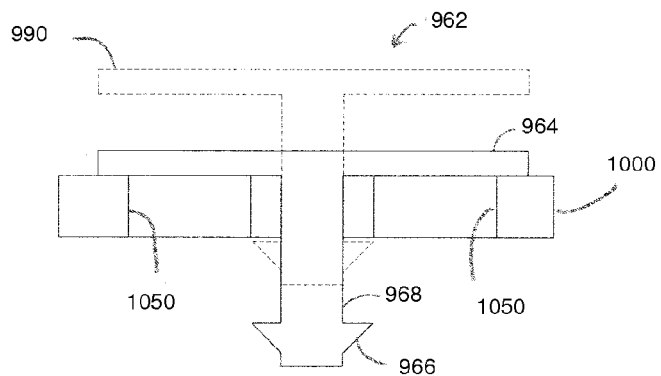
FIG. 9 is a cross-sectional view of a poppet valve in accordance with various embodiments.
Figure 10:
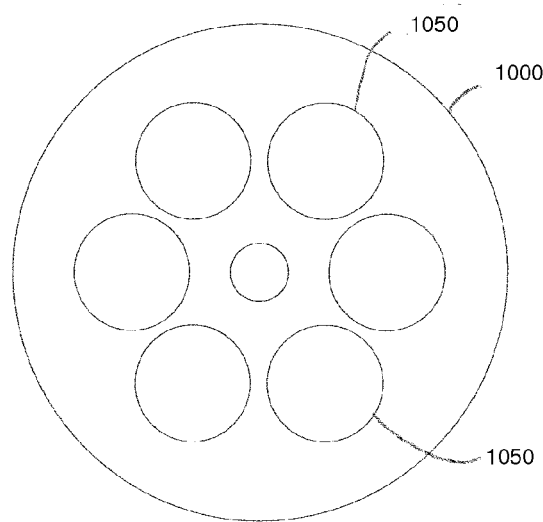
FIG. 10 is a top view of a valve seat in accordance with various embodiments.

FIGS. 8, 9, and 10 illustrate exemplary valve configurations in accordance with various embodiments. FIG. 8 illustrates a cross-sectional view of an umbrella valve 862. Umbrella valve 862 may be used in conjunction with a valve seat 1000, as further illustrated in FIG. 10. Valve seat 1000 may define a plurality of apertures 1050. In its relaxed state, umbrella valve 862 may comprise a flexible disc 864 that seals apertures 1050. When the atmospheric pressure above valve seat 1000 is lower than that below valve seat 1000, flexible disc 864 is deformed away from valve seat 1000 (illustrated by flexed disc 866) exposing apertures 1050 and allowing the passage of air from the high-pressure side of valve seat 1000. When the atmospheric pressure above valve seat 1000 is equal to or greater than that below valve seat 1000, flexible disc 864 returns to its relaxed state, sealing apertures 1050 and preventing the passage of air from the high-pressure side of valve seat 1000. By maximizing the size and number of apertures 1050, the speed at which the airspace of the vessel is evacuated can be maximized.

FIG. 9 is a cross-section illustration of a poppet valve 962 similar to valve 362 illustrated in FIGS. 3A, 3B, and 3C. In various embodiments, poppet valve 962 may comprise a sealing disc 964, a collet 966, and a stem 968. Poppet valve 962 may be configured to slide vertically with respect to valve seat 1000. When the atmospheric pressure above valve seat 1000 is lower than that below valve seat 1000, poppet valve 962 is lifted away from valve seat 1000 (illustrated by raised poppet valve disc 990) exposing apertures 1050 and allowing the passage of air from the high-pressure side of valve seat 1000. As illustrated, the amount of vertical displacement may be determined by the length of stem 968 and the position of collet 966 on stem 968. When the atmospheric pressure above valve seat 1000 is equal to or greater than that below valve seat 1000, poppet valve 962 returns to valve seat 1000, sealing apertures 1050 and preventing the passage of air from the high-pressure side of valve seat 1000.

Figure 11:
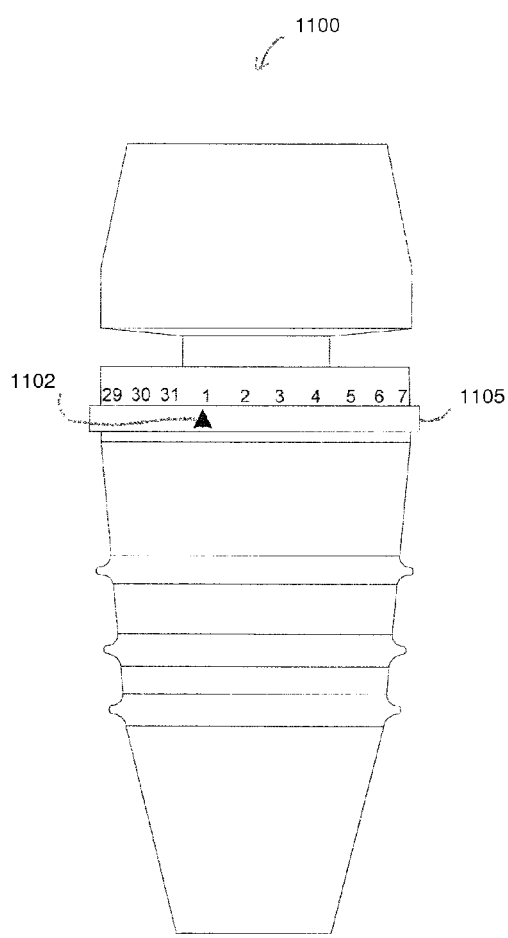
FIGS. 11 and 12 are side views of two stoppers in accordance with various embodiments.
Figure 12:
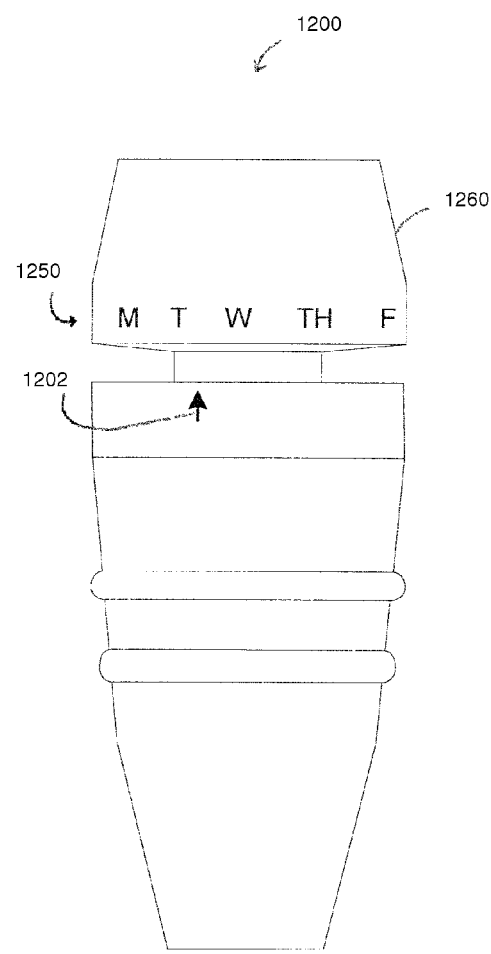

FIGS. 11 and 12 illustrate various embodiments of date indicators in accordance with various embodiments. FIG. 11 illustrates a stopper 1100 comprising a rotating bezel 1105 that comprises an indicator 1102. A series of numbers, such as 1 through 31, are inscribed around the perimeter of stopper 1100. Bezel 1102 may be rotated to position indicator 1102 proximate a desired number. FIG. 12 illustrates a stopper 1200 comprising a stopper top 1260 comprising a day of the week indicator 1250. Day of the week indicator 1250 may comprise letters representing the days of the week. Stopper top 1260 may be rotated in order to orient the stopper top 1260 relative to an indicator 1202. While FIGS. 11 and 12 illustrate example indicating techniques, it is appreciated that any type of indicating techniques may be implemented, such as any combination of inscriptions, sliders, or bezels, for example. Further, while days of the week and month have been illustrated, it is appreciated that other events or temporal units may be indicated with the stopper. For example, the time of day the bottle or other container was opened may be indicated by the stopper. In one embodiment, the name of the person who opened the container may be indicated by the stopper. Additionally, any suitable technique may be used for providing the inscription on the stopper. Non-limiting inscription techniques include printing, etching, painting, screen printing, and molding, for example.

Figures 13A, 13B:
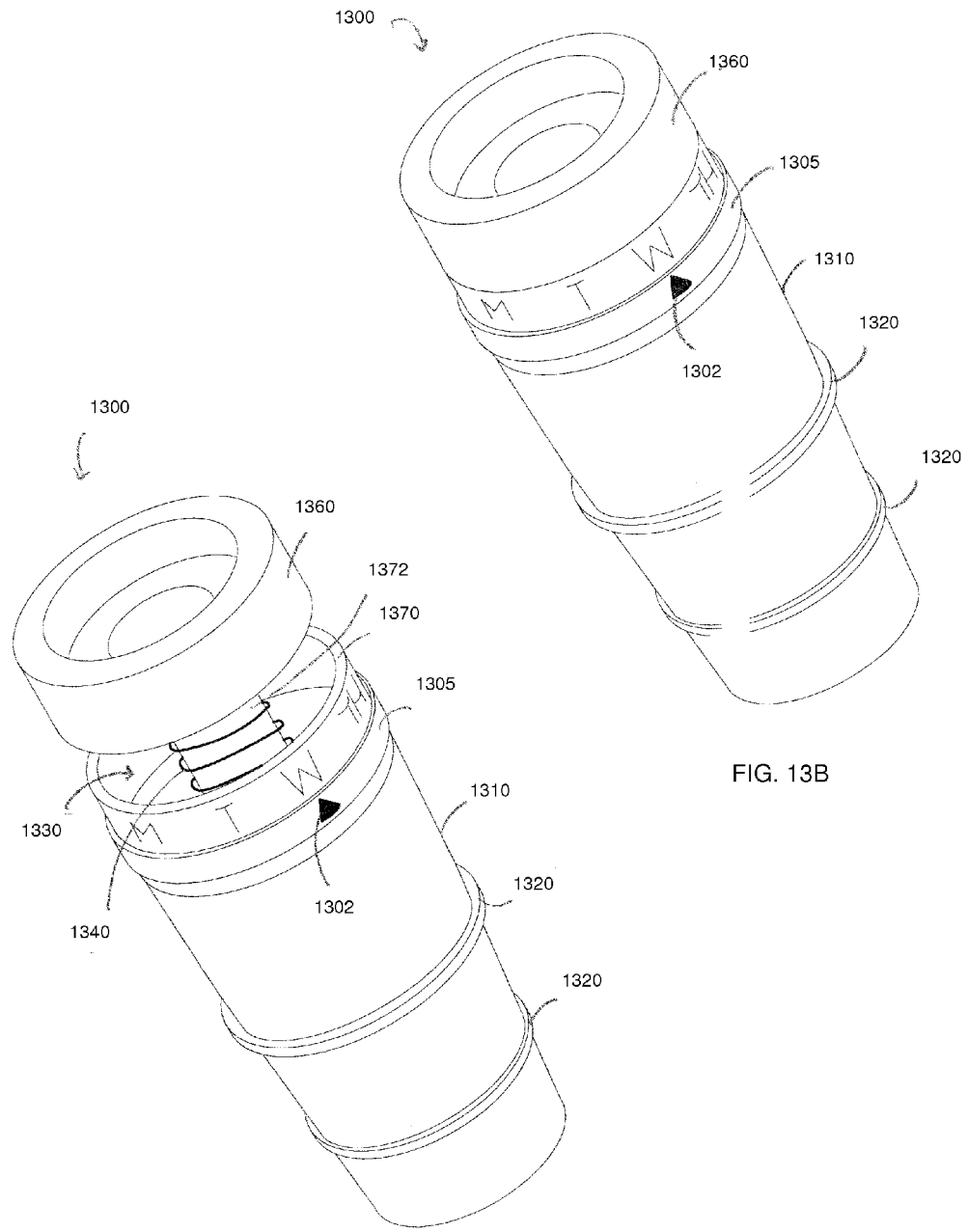
FIGS. 13A and 13B are perspective views of two stoppers in accordance with various embodiments.

FIGS. 13A and 13B are perspective illustrations of a stopper in accordance with various embodiments. In FIG. 13A, stopper top 1360 is separated from stopper base 1310, thereby allowing the low vacuum indicator 1330 to be visible. In this embodiment, the low vacuum indicator is a wall 1372 of collar 1370. This embodiment also comprises a rotating bezel 1305 comprising an indicator 1302. The days of week are inscribed around the perimeter of the collar 1370. A spring 1340 is used to provide a biasing force. While a spring 1340 is illustrated, it is appreciated that any device or combination of devices may be used to provide the biasing force, such as coil springs, leaf springs, o-rings, for example. Stopper 1300 may also comprise at least one sealing rib 1320 for engagement with a container. In FIG. 13B, stopper top 1360 is drawn toward stopper base 1310, such as during a vacuum condition. As illustrated, low vacuum indicator 1330 is not visible. If however, the vacuum level in the container (not shown) was to lose vacuum, the vacuum level would not be strong enough to overcome the biasing force of spring 1340. In such situations, stopper top 1360 may separate from collar 1370 and expose low vacuum indicator 1330.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A stopper to seal an opening of a container and to allow the removal of air from the container with a vacuum source, said stopper comprising:
   a bottom portion sized to fit within the opening of the container, wherein the bottom portion has at least one frustoconical portion to engage an inner surface of the container;
   a top portion, said top portion comprising a vacuum source interface and a radial flange; wherein the top portion is slidably engaged to the bottom portion such that the radial flange engages the bottom portion in a first position when little or no vacuum is present in the container and wherein the radial flange translates away from the bottom portion to a second position when a desired vacuum level is present in the container;
   a valve engaged to the top portion;
   an inscription about an outer circumference surface of the stopper; and
   an indicator to selectably identify a portion of said inscription.

2. The stopper of claim 1 further comprising a rotating bezel.

3. The stopper of claim 2, wherein one of said inscription and said indicator is located on said rotating bezel.

4. The stopper of claim 1, wherein said top portion translates from the first position to the second position as the pressure in the container approaches the desired vacuum level.

5. The stopper of claim 4 further comprising a low vacuum indicator, wherein said low vacuum indicator is visible when said top portion is in said first position and wherein said low vacuum indicator is at least partially obscured when said top portion is in said second position.

6. The stopper of claim 4 further comprising a biasing device, wherein said biasing device applies a force to said top portion parallel to a longitudinal axis of the stopper, to maintain said top portion in said first position in the absence of the desired vacuum level in the container, wherein the force causes the flange to engage the bottom portion.

7. The stopper of claim 6, wherein said biasing device permits translation of said top portion relative to said bottom portion in the presence of the desired vacuum level in the container.

8. The stopper of claim 6, wherein said biasing device is at least one of an o-ring and a spring, wherein the biasing device is received within a collar of the bottom portion and the biasing device is a color in contrast to the bottom portion and the top portion.

9. The stopper of claim 1, wherein said valve is at least one of a poppet valve, an umbrella valve, a cross slit valve, and a duckbill valve.

10. A stopper to seal an opening of a container and to allow the removal of air from the container with a vacuum source, said stopper comprising:
  a first portion comprising a base sized to fit within the opening of the container and a collar engaged to a top surface of the base, wherein the collar projects away from the container and the base is generally frustoconical;
  a second portion slidably engaged to the first portion and movable between a first position and a second position; wherein a flange of the second portion engages the first portion in the first position;
  a valve engaged to the second portion;
  a low vacuum indicator, wherein said low vacuum indicator is visible when said second portion is in said first position and wherein said low vacuum indicator is at least partially obscured when said second portion is in said second position; and
  a biasing device for applying a force to said second portion to maintain said second portion in said first position and permit translation of said second portion to said second position in the presence of a desired vacuum level in the container, wherein the biasing device is operatively engaged to the collar and the second portion.

11. The stopper of claim 10, wherein said first portion receives at least a portion of said second portion.

12. The stopper of claim 11, wherein said collar defines a groove for receiving said biasing device.

13. The stopper of claim 11, wherein said collar comprises a contrasting color portion, wherein the contrasting color portion is different in color from at least one of the base or the second portion.

14. The stopper of claim 10, wherein said biasing device is an o-ring.

15. The stopper of claim 14, wherein said o-ring is a contrasting color, wherein the contrasting color portion is different in color from at least one of the base, the collar, or the second portion.

16. The stopper of claim 10 further comprising:
  an inscription about an outer circumference surface of the stopper; and
  an indicator to selectably identify a portion of said inscription.

17. The stopper of claim 16, wherein said inscription comprises temporal units.

18. The stopper of claim 16 further comprising a rotating portion.

19. The stopper of claim 18, wherein said rotating portion comprises one of said inscription and said indicator.

20. The stopper of claim 10, wherein said first portion comprises at least one sealing ring having an outer diameter greater than an inner diameter of the opening.

21. The stopper of claim 10, wherein said valve is at least one of a poppet valve, an umbrella valve, a cross slit valve, and a duckbill valve.

22. A stopper to seal an opening of a container and to allow the removal of air from the container with a vacuum source, said stopper comprising:
  a first portion sized to fit within the opening of the container;
  a second portion slidably engaged to the first portion and movable between a first position and a second position; the second portion comprising a flange that engages the first portion in the first portion and wherein the flange is translated away from the first portion in the second position;
  a valve engaged to the second portion;
  a low vacuum indicator, wherein said low vacuum indicator is visible when said second portion is in said first position and wherein said low vacuum indicator is at least partially obscured when said second portion is in said second position;
  a biasing device to maintain said second portion in said first position in the absence of a desired vacuum level in the container and permit translation of said second portion to said second position in the presence of the desired vacuum level in the container, wherein the biasing device is engaged to a top portion of the first portion and a bottom portion of the second portion;
  an inscription; and
  an indicator to selectably identify a portion of said inscription.

23. The stopper of claim 22, wherein said low vacuum indicator is obscured in the presence of a pre-determined vacuum level in the container.

24. The stopper of claim 22, wherein said inscription comprises temporal units.

25. The stopper of claim 1, wherein said inscription comprises at least one of days of a week and days of a month.

26. The stopper of claim 1, wherein a bottom portion inner diameter is substantially equal to an inner diameter of the container to maximize a flow rate of air removed by the vacuum source.

* * * * *